United States Patent
McCarthy et al.

(10) Patent No.: US 7,143,413 B2
(45) Date of Patent: Nov. 28, 2006

(54) METHOD AND SYSTEM FOR ALLOCATING SYSTEM RESOURCES AMONG APPLICATIONS USING WEIGHTS

(75) Inventors: Clifford A. McCarthy, Richardson, TX (US); Canming Jin, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 738 days.

(21) Appl. No.: 10/144,991

(22) Filed: May 15, 2002

(65) Prior Publication Data

US 2004/0194089 A1 Sep. 30, 2004

(51) Int. Cl.
*G06F 9/46* (2006.01)
*G06F 15/173* (2006.01)

(52) U.S. Cl. .................. 718/104; 718/100; 718/102; 709/223; 709/226

(58) Field of Classification Search ........ 718/100–108; 709/223–227; 705/1
See application file for complete search history.

(56) References Cited

U.S. PATENT DOCUMENTS

| 5,247,634 | A |   | 9/1993  | Cline et al.     | 395/425 |
|-----------|---|---|---------|------------------|---------|
| 5,325,525 | A | * | 6/1994  | Shan et al.      | 718/104 |
| 5,668,995 | A |   | 9/1997  | Bhat             | 395/674 |
| 5,727,178 | A |   | 3/1998  | Pletcher et al.  | 395/412 |
| 5,784,616 | A |   | 7/1998  | Horvitz          | 395/672 |
| 5,790,862 | A |   | 8/1998  | Tanaka et al.    | 395/705 |
| 5,838,968 | A | * | 11/1998 | Culbert          | 718/104 |
| 5,889,989 | A |   | 3/1999  | Robertazzi et al.| 395/675 |
| 6,148,324 | A | * | 11/2000 | Ransom et al.    | 718/105 |
| 6,209,066 | B1|   | 3/2001  | Holzle et al.    | 711/153 |
| 6,272,519 | B1| * | 8/2001  | Shearer et al.   | 718/104 |
| 6,282,560 | B1| * | 8/2001  | Eilert et al.    | 718/100 |
| 6,336,127 | B1|   | 1/2002  | Kurtzberg et al. | 709/104 |
| 6,338,072 | B1| * | 1/2002  | Durand et al.    | 707/205 |
| 6,859,926 | B1| * | 2/2005  | Brenner et al.   | 718/100 |
| 6,931,640 | B1| * | 8/2005  | Asano et al.     | 718/104 |
| 2001/0044817 | A1 | * | 11/2001 | Asano et al. | 709/100 |
| 2002/0082856 | A1 | * | 6/2002  | Gray et al.  | 705/1   |
| 2003/0028642 | A1 | * | 2/2003  | Agarwal et al.| 709/226|

FOREIGN PATENT DOCUMENTS

WO    WO 03/005217    *    7/2001

OTHER PUBLICATIONS

Brandt et al., "A Dynamic Quality of Service Middleware Agent for Mediating Application Resource Ussage", IEEE, 1998, pp. 1-12.*
Rajkumar et al., "A Resource Allocation Model for QOS Management", IEEE, 1997, pp. 298-307.*

* cited by examiner

*Primary Examiner*—Meng-Ai An
*Assistant Examiner*—Jennifer N. To

(57) ABSTRACT

A method is disclosed for allocating computer system resources, such as memory, among applications. Input parameters are received for applications. The parameters include a minimum entitlement value, a maximum entitlement value, and a weight. The minimum entitlement is the minimum amount of resources that the application should receive. The maximum entitlement is the maximum amount of resources that the application should receive. The weight specifies the priority of the application relative to other applications, for purposes of distributing system resources. Computer system resources are then allocated among applications based on the parameters.

9 Claims, 9 Drawing Sheets

Fig. 4a

Application Parameters -- All Applications Active

| Application | Min(g) | Max(g) | Weight(g) |
|---|---|---|---|
| A | 10 | 80 | 2 |
| B | 5 | 20 | 5 |
| C | 50 | 60 | 2 |
| D | 10 | 100 | 1 |

Fig. 4b

Total Resources = 185

| Application | Allocation | Request(g) | Allocation Ratio | Request Ratio |
|---|---|---|---|---|
| A | 10 | 80 | 5 | 40 |
| B | 5 | 20 | 1 | 4 |
| C | 50 | 60 | 25 | 30 |
| D | 10 | 100 | 10 | 100 |

| Pass | Previous Target Ratio | Current Target Ratio | Current Set | Sum of Weights in Current Set | Product of Weights and Difference between Current and Previous Target Ratios | Allocation | | Unallocated Resources |
|---|---|---|---|---|---|---|---|---|
| 1 | 1 | 4 | B | 5 | 15 | A<br>B<br>C<br>D | 10<br>20*<br>50<br>10 | 95 |
| 2 | 4 | 5 | 0 | 0 | 0 | A<br>B<br>C<br>D | 10<br>20<br>50<br>10 | 95 |
| 3 | 5 | 10 | A | 2 | 10 | A<br>B<br>C<br>D | 20*<br>20<br>50<br>10 | 85 |
| 4 | 10 | 25 | AD | 3 | 45 | A<br>B<br>C<br>D | 50*<br>20<br>50<br>25* | 40 |
| 5 | 25 | 30 | ACD | 5 | 25 | A<br>B<br>C<br>D | 60*<br>20<br>60*<br>30* | 15 |
| 6 | 30 | 40 | AD | 3 | 30 | | | |

Final Ratio = 30 + 15/3 = 35

| | Final Allocation |
|---|---|
| A | 70* |
| B | 20 |
| C | 60 |
| D | 35* |

Fig. 5a

Application Parameters

| Application | Status | Min(g) | Max(g) | Weight(g) |
|---|---|---|---|---|
| A | Inactive | 10 | 80 | 2 |
| B | Active | 5 | 20 | 5 |
| C | Active | 50 | 60 | 2 |
| D | Active | 10 | 100 | 1 |

Fig. 5b

Total Resources = 185

| Application | Allocation | Request(g) | Allocation Ratio | Request Ratio |
|---|---|---|---|---|
| A | 10 | 10 | 5 | 5 |
| B | 5 | 20 | 1 | 4 |
| C | 50 | 60 | 25 | 30 |
| D | 10 | 100 | 10 | 100 |

| Pass | Previous Target Ratio | Current Target Ratio | Current Set | Sum of Weights in Current Set | Product of Weights and Difference between Current and Previous Target Ratios | Allocation | | Unallocated Resources |
|---|---|---|---|---|---|---|---|---|
| 1 | 1 | 4 | B | 5 | 15 | A<br>B<br>C<br>D | 10<br>20*<br>50<br>10 | 95 |
| 2 | 4 | 5 | A | 2 | 10 | A<br>B<br>C<br>D | 10<br>20<br>50<br>10 | 95 |
| 3 | 5 | 10 | 0 | 0 | 0 | A<br>B<br>C<br>D | 10<br>20<br>50<br>10 | 95 |
| 4 | 10 | 25 | D | 1 | 15 | A<br>B<br>C<br>D | 10<br>20<br>50<br>25* | 80 |
| 5 | 25 | 30 | CD | 3 | 15 | A<br>B<br>C<br>D | 10<br>20<br>60*<br>30* | 65 |
| 6 | 30 | 100 | D | 1 | 70 | | | |

Final Ratio = 30 + 65/1 = 95

| | Final Allocation |
|---|---|
| A | 10 |
| B | 20 |
| C | 60 |
| D | 95* |

METHOD AND SYSTEM FOR ALLOCATING SYSTEM RESOURCES AMONG APPLICATIONS USING WEIGHTS

TECHNICAL FIELD

The technical field relates generally to computer systems. More particularly, the technical field relates to allocation of system resources, such as memory, among applications running on the system.

BACKGROUND

In the field of computer systems, it is desirable to allocate system resources among various groups of processes running on the system. A computer system may have limited resources, and users of that system may want to ensure that those resources are allocated in a particular manner so they may be used most efficiently. The user may allocate system resources among groups directly, or indirectly through the system whereby the allocations are determined by other system processes. The user may also allocate maximum limits of allocations for some or all of the groups to improve efficiency.

System resources include any limited resource in the computer system, including but not limited to memory resources, central processing unit (CPU) resources, input/output (I/O) bandwidth (such as disk I/O bandwidth or network I/O bandwidth), etc. Groups of processes using those resources may be software applications running on the system, portions of applications, or any other processes that use system resources.

A problem occurs when one of the groups is inactive or not enabled. By way of example, a group may become inactive if it is taken off-line, if it only operates during certain hours of the day, or if it is otherwise turned off and is not using a system resource. In the case of a software application as a group, the application may run only at certain times of the day or only in response to certain other system activities. What is needed is a method and system for efficiently allocating system resources according to the needs of the applications.

SUMMARY

A method is disclosed for allocating computer system resources, such as memory, among applications. Input parameters are received for applications. The parameters include a minimum entitlement value, a maximum entitlement value, and a weight. The minimum entitlement is the minimum amount of resources that the application should receive. The maximum entitlement is the maximum amount of resources that the application should receive. The weight specifies the priority of the application relative to other applications, for purposes of distributing system resources. Computer system resources are then allocated among applications based on the parameters.

A method is also disclosed for allocating computer resources, such as memory, among applications based on parameters specified by for the applications, for example, by a user. The parameters include, for each application, a minimum entitlement, a maximum entitlement, and a weight. Weight ratios are calculated, including an allocation ratio equal to the amount of resources already allocated to the application divided by the weight, and request ratio equal to the amount of requested resources divided by the weight. Using these weight ratios, a target ratio is set and a current set of applications is defined based on the weight ratios. The method determines whether there are sufficient unallocated resources to allocate to each application in the current set using the target ratio. If there are sufficient unallocated resources, then the method changes the target ratio to a new target ratio and again determines whether there are sufficient unallocated resources to allocate to each application in the current set using the new target ratio.

A computer system is also disclosed having a memory and a processor. The processor executes instructions to perform a method of allocating system resources among multiple applications. The method performed by the system receives parameters for the applications, including a minimum entitlement, a maximum entitlement, and a weight. Based on these parameters, the method allocates system resources among the applications. A tangible computer-readable medium is also disclosed having stored thereon computer-executable instructions for performing a method of allocating computer system resources.

DESCRIPTION OF THE DRAWINGS

The detailed description will refer to the following drawings, wherein like numerals refer to like elements, and wherein:

FIGS. 4*a–d* show example calculations of memory allocations; and

FIGS. 5*a–d* show additional example calculations of memory allocations.

DETAILED DESCRIPTION

Figure 1:
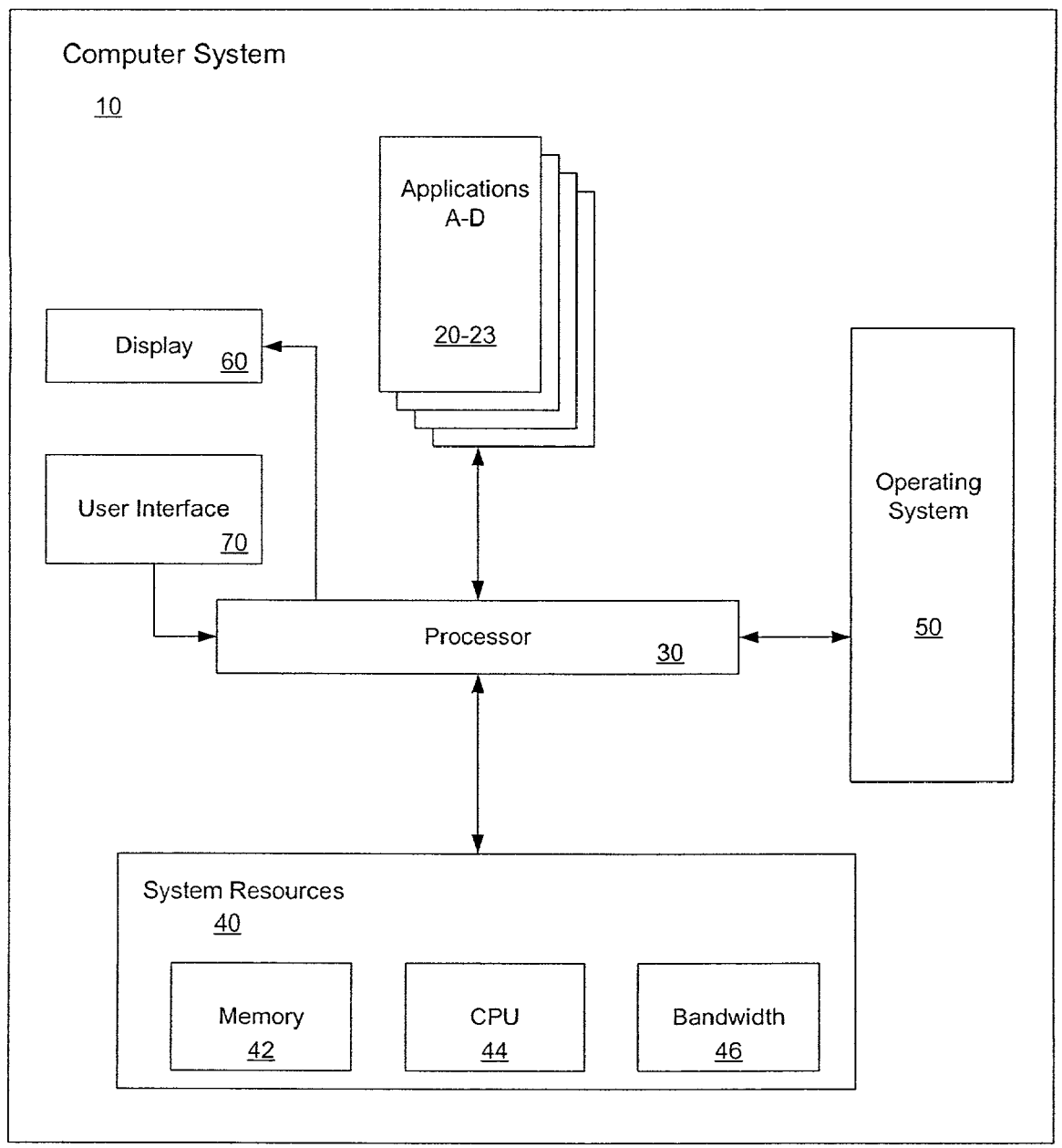
FIG. 1 shows a computer system in which the method of allocating system resources is implemented.

FIG. 1 shows a computer system 10 in which a method of allocating system resources is implemented. The computer system 10 includes a processor 30 that executes applications 20–23 using an operating system 50. The processor 30 receives input signals from a user input device 70. The processor 30 outputs data to a display 60. The computer system 10 includes system resources 40, such as memory 42, a central processing unit (CPU) 44, and input/output (I/O) bandwidth 46. At any given time, each application 20–23 may be either active or inactive.

The method and system allocate system resources 40 to applications 20–23 based on parameters specified for each application 20–23, for example, by a user via a user input device 70. As used herein, the term "application" refers to a process or a group of processes that accesses system resources. An application includes, for example, a software application or module. For convenience and by way of example only, the system 10 is described herein with respect to memory 42 as the resource 40 that is allocated. The parameters include, for each application (g), a minimum entitlement, min(g), a maximum entitlement, max(g), and a weight of the application, weight(g). The minimum and maximum entitlements refer to minimum and maximum amounts of memory that should be granted to the application. As used herein, the term "weight" refers to a factor used to allocate system resources, such that applications having different weights are allocated different amounts of unallocated resources during an allocation.

As the applications 20–23 become active and inactive, the system 10 adjusts the distribution of the system resources 40 to more efficiently use those resources. In general, as when an application 20–23 becomes inactive, the system 10 attempts to reallocate some of that application's resources 40 to active applications, if possible. In one embodiment, the method of allocating system resources is repeated dynamically, for example in a loop, such that the system 10 continuously determines whether the system resources 40 should be reallocated.

Figure 2:
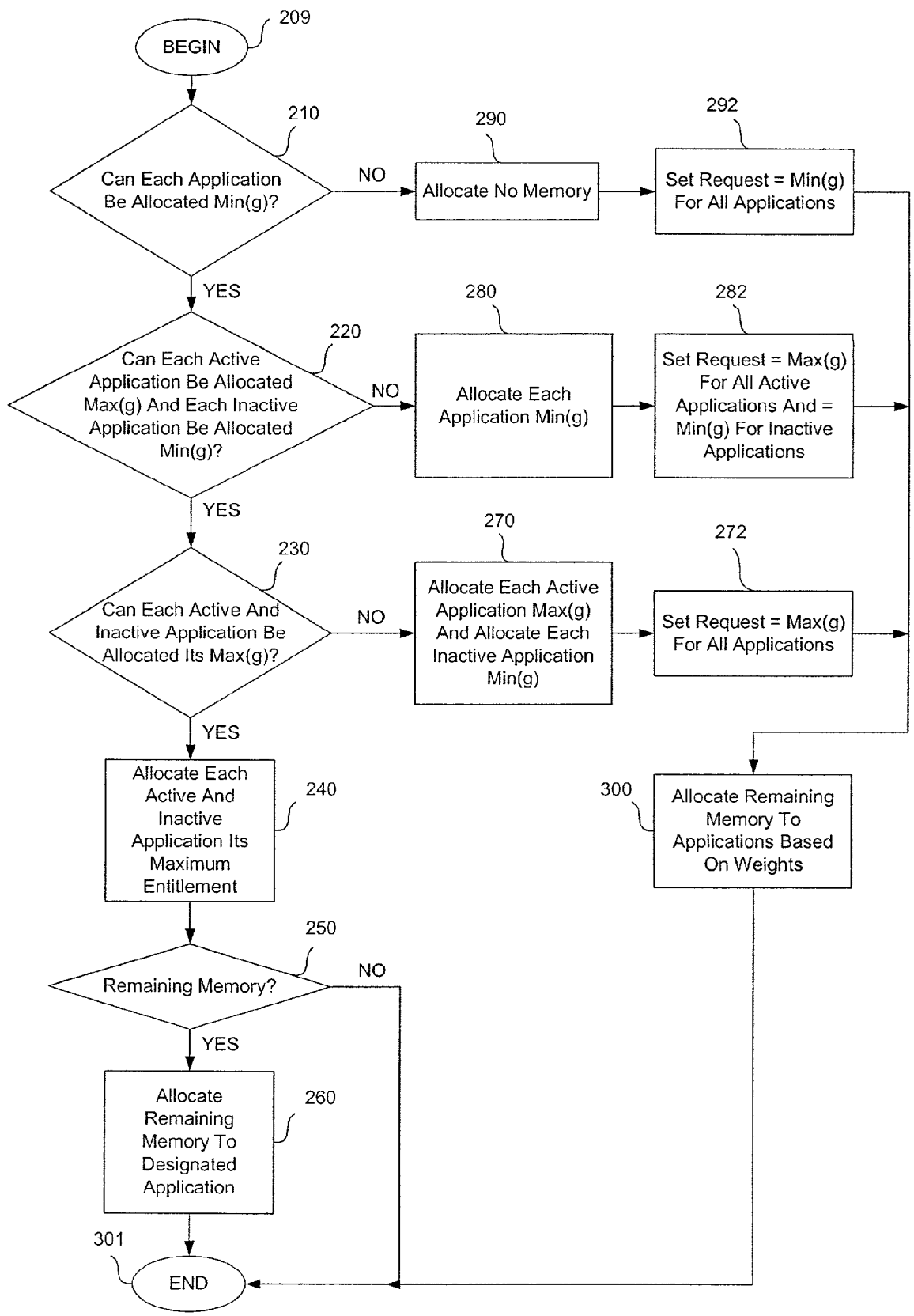
FIG. 2 shows a flow chart of a method for allocating memory.

FIG. 2 is a flow chart of a method for allocating memory among applications in the computer system 10. Unless sufficient memory exists for every active and inactive application 20–23 to receive its maximum entitlement (max(g)), then the memory is allocated based on the applications' weights, subject to the minimum and maximum entitlements. In the example of FIG. 2, the method begins (block 209) and determines whether each application 20–23 can be allocated its minimum entitlement, block 210. If every application 20–23 cannot receive its minimum entitlement, then no memory is allocated initially, block 290. Each application 20–23 then attempts to receive its minimum entitlement by setting a variable, request(g) (also referred to as the "requested amount"), to min(g) (block 292) and allocating the available memory based on weights, block 300. In an alternative embodiment, the system 10 does not allow the user to specify minimum entitlement values that would exceed the total system resources, so the "no" branch at step 210 would be unnecessary.

If each application 20–23 can receive its minimum entitlement (min(g)) ("yes" branch at block 210), then the method determines whether there is sufficient available memory for each active application to receive its maximum entitlement (max(g)) and for each inactive application to receive its minimum entitlement (min(g)), block 220. If every active application cannot receive its maximum entitlement, then each active and inactive application 20–23 is allocated its minimum entitlement, block 280. Each active application then seeks its maximum entitlement by setting the variable, request(g), equal to max(g) for active applications and sets request(g) equal to min(g) for inactive applications, block 282. Any remaining memory is then allocated to the applications based on their weights, block 300.

If each active application can receive its maximum entitlement ("yes" branch at block 220), then the method determines whether sufficient memory is available for each active and inactive application 20–23 to receive its maximum entitlement 230. If every active and inactive application 20–23 cannot receive its maximum entitlement, then each active application is allocated its maximum entitlement and each inactive application is allocated its minimum entitlement, block 270. The requested amount is set equal to max(g) for all applications, block 272. The remaining memory is effectively allocated to the inactive applications based on their weights, block 300.

If each active and inactive application 20–23 can receive its maximum entitlement ("yes" branch at block 230), then the applications 20–23 are allocated their maximum entitlements 240. The method determines whether there is any memory remaining 250. If there is no memory remaining, the method 300 ends, block 301. If there is memory remaining, then the example method of FIG. 2 allocates the remaining memory to a designated or default application 260. Other implementations may use different methods to distribute resources remaining after satisfying each application's maximum entitlements.

Figure 3:
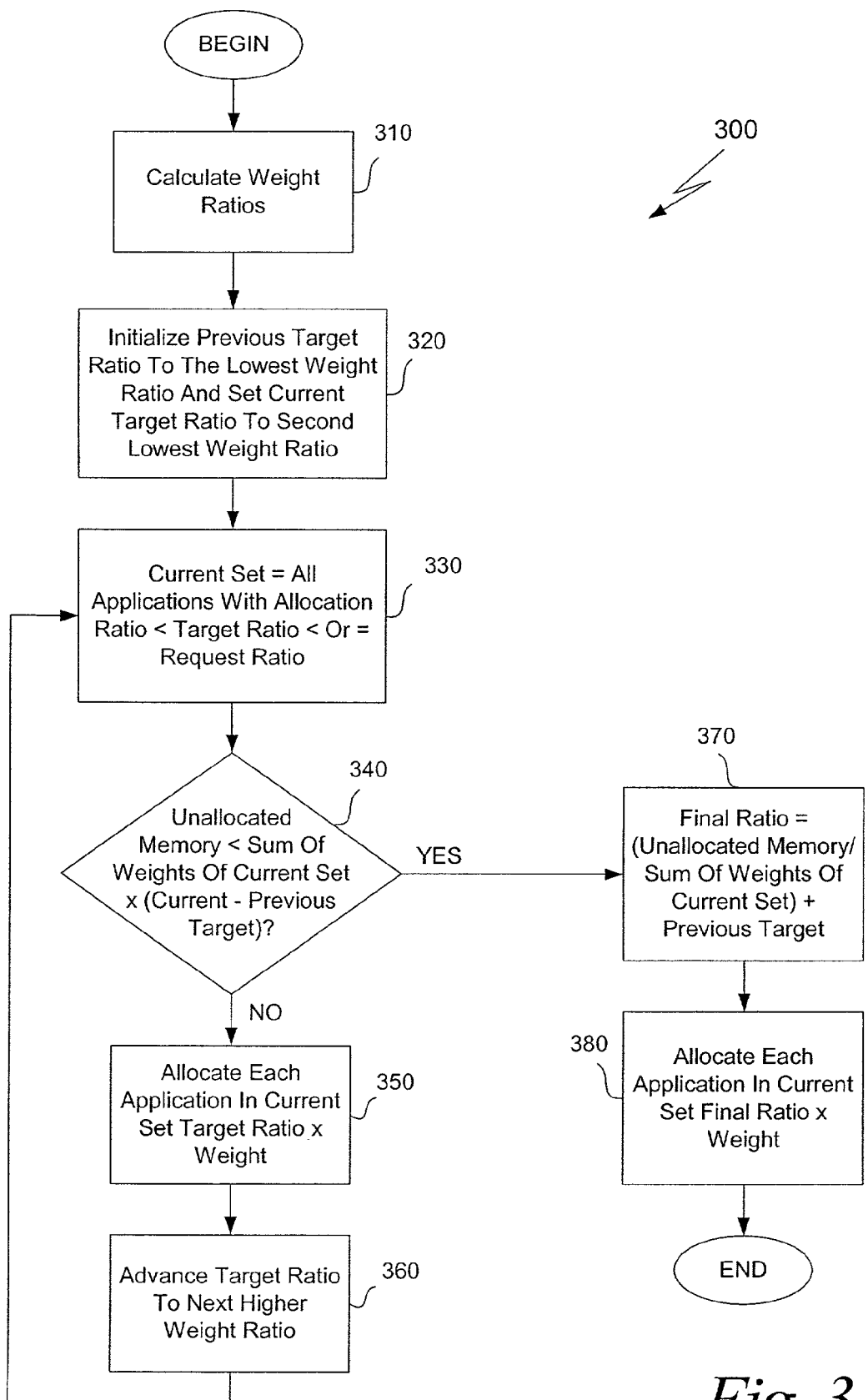
FIG. 3 is a flow chart of a method for allocating memory based on weights, as shown in step 300 of FIG. 2.

FIG. 3 shows a flow chart of one implementation of the method 300 for allocating remaining memory among applications 20–23 based on weights, using the requested amount. Weight ratios are calculated 310 and used to allocate memory. The weight ratios may include an allocation ratio, which is the amount of memory already allocated to the application divided by the weight of the application (weight(g)), and the request ratio, which is the requested amount (request(g)) divided by the weight (weight(g)).

A target ratio is a ratio used by the method 300 to allocate the resources, whereby the method 300 attempts to allocate available resources to applications in proportion to the target ratio. The method 300 begins with a low value for the target ratio and attempts to allocate memory based on that target ratio. The method 300 then advances to a higher target ratio and again attempts to allocate memory. This process of increasing the target ratio continues until the method 300 reaches a target ratio too large to use for allocating memory. In the embodiment shown in FIG. 3, the method 300 tracks both a current target ratio and a previous target ratio. The current target ratio is the target ratio currently under test to determine whether resources can be allocated using the current target ratio. When the target ratio advances, the previous target ratio is stored and used by the method 300.

In the example of FIG. 3, the previous target ratio is initially set equal to the lowest weight ratio, block 320; that is, the lowest allocation ratio or request ratio. The current target ratio is initially set equal to the second lowest weight ratio, block 320. In one embodiment, if two weight ratios are equal, the ratio used is the next lowest value, such that the current and target ratios have different values. For example, if the weight ratios in ascending order for applications A–C are 0, 0, 0, 10, 20, and 50, then the previous target ratio will initially be set equal to zero (as the lowest weight ratio) and the current target ratio will be set equal to 10 (as the second-lowest weight ratio). This occurs, for example, when there are insufficient resources to allocate each application 20–23 its minimum and the allocation ratio is set to 0 for each of the applications 20–23 (following the "no" branch at block 210 in FIG. 2). Along this branch of the flow chart of FIG. 2, the initial allocation ratios will all be equal to zero. This also occurs any other time in which more than one application share a common weight ratio.

The method 300 defines a "current set" of applications 20–23 that may change as the method 300 is applied. The current set of applications 20–23 is defined as the set of all those applications having an allocation ratio less than the target ratio, and having a request ratio greater than or equal to the target ratio, block 330. The method 300 progresses through the weight ratios, beginning with the lowest, and attempts to use that "target ratio" to allocate memory to the current set of applications. If there is sufficient memory to allocate to the current set of applications using the target ratio, then the memory is allocated to applications in the current set based on the target ratio. The target ratio advances to the next lowest weight ratio, and the method 300 again attempts to allocate memory based on the new target ratio. This continues until there is insufficient memory to distribute, at which point the unallocated memory is distributed based on the sum of the weights in the current set.

The method 300 determines whether the unallocated memory is less than the sum of the weights of the current set of applications times the current target ratio less the previous target ratio, block 340. If the unallocated memory exceeds the sum of the weights of the current set of applications ("no" branch at block 340), then there is sufficient memory to allocate memory to each application in the current set using the target ratio. Each application in the current set is allocated memory equal to the target ratio multiplied by the weight of the application (weight(g)), block 350. In the example shown in FIG. 3, the amount allocated in block 350 replaces amounts previously allocated. For example, if application A was previously allocated 60 units of memory and the current target ratio would allocate it a total of 80 units of memory, then the previously-allocated amount of 60 is replaced with 80. In other embodiments, the functions may be additive, whereby the method determines the amount of memory to add to the memory already allocated, rather than calculating an amount to replace the current allocation. The current target ratio then advances to the value of the next highest weight ratio for all applications, block 360, and the method 300 loops back to block 330.

The current set is then redefined, block 330, removing those applications that reached their maximum entitlement (max(g)) during the previous allocation and adding those applications that become entitled to memory in the next allocation round, based on their parameters. The method 300 again determines whether there is sufficient unallocated memory to distribute to the current set based on the sum of their weights, block 340. When there is no longer sufficient unallocated memory ("yes" branch at block 340), a final ratio is calculated by dividing the unallocated memory by the sum of the weights in the current set of applications, and adding that value to the previous target ratio 370. Each application in the current set is then allocated memory equal to the product of the final ratio and its weight (weight(g)) 380.

FIGS. 4*a*–*d* show example calculations of memory allocations using the method described in FIGS. 2 and 3. FIG. 4*a* shows the application parameters for four applications A–D, which may be received, for example, from a user input device 70. In this example, all applications are active. The applications A–D have minimum entitlements of 10, 5, 50, and 10, respectively. The applications A–D have respective maximum entitlements of 80, 20, 60, and 100 and weights of 2, 5, 2, and 1, respectively. In this example, the total available system memory is 185 units. Following the method described in FIG. 2, the sum of the minimum entitlements is 75, so that sufficient memory exists for each application A–D to receive its minimum entitlement (min (g)) ("yes" branch at block 210 in FIG. 2). The sum of the maximum entitlements for the applications (because they are all active) is 260, which exceeds the total memory of 185 so each application cannot receive its maximum entitlement ("no" branch at block 220 in FIG. 2).

FIG. 4*b* shows the calculation of the allocation, the request(g), and the allocation and request ratios for each application A–D. Each application A–D has been allocated its minimum entitlement (block 280 in FIG. 2), so the initial allocations for applications A–D are 10, 5, 50, and 10, respectively. The unallocated memory is now 110 (185 minus 75). The request(g) for each application A–D is set equal to each application's maximum entitlement (max(g)) (because all applications A–D are active) (block 282 in FIG. 2). For the applications A–D, the requests are set equal to 80, 20, 60, and 100, respectively. Initially, the allocation ratios are calculated as the allocations (min(g) for each application in this example) divided by the weights of the applications (block 310 in FIG. 3). The request ratios are calculated as the requests (max(g) in this example) divided by the weights of the applications (block 310 in FIG. 3).

FIG. 4*c* shows the calculations of the example as memory is allocated through the method shown in the lower portion of the flow chart of FIG. 3, as the method walks through the loop, defined as blocks 330–360, attempting to allocate memory based on various target ratios. During the first pass through the loop, the previous target ratio is set to 1, as the lowest of the allocation and request ratios, and the current target ratio is set to 4, as the second lowest of the allocation and request ratios. In this example, both the current and previous target ratios derive initially from the same application, application B. The current set is defined (block 330 in FIG. 3) as those applications having an allocation ratio less than the target ratio and a request ratio less than or equal to the target ratio. In this example, during the first pass, only application B is in the current set. The sum of the weights of the current set is therefore 5. The product of the sum of the weights and the difference between the current and previous target ratios is 15 (5×(4−1)). Because the unallocated memory (110 units) exceeds this product ("no" branch at block 340 in FIG. 3), the current target ratio can be used to allocate memory to the current set. Application B receives 20 units of memory (4×5) to replace the 10 previously allocated to application B. In the example shown in FIG. 4*c* under the "Allocation" column, those applications receiving memory during the pass through the loop are indicated with an asterisk. After allocating 15 units to application B, the unallocated memory now has a value of 95 (110 units−15 units). The target ratio is advanced (block 360 in FIG. 3) to the value of the next highest weight ratio, and the method 300 loops back to block 330 to try to allocate based on this target ratio.

During the second pass through the loop, the previous target is 4 and the current target is 5. No applications fit within the current set so no memory is allocated during the second pass. The target ratio is again advanced (block 360 in FIG. 3) and the method 300 makes a third pass. During the third pass, the current target is 10, the previous target is 5. Only application A fits within the current set defined in pass three. Application A's weight is 2, and the product of its weight and the difference between the current and previous target ratios is 10 (2×(10−5)). Application A's allocation then becomes 20, and the unallocated memory now totals 85. The target ratio advances to the next higher weight ratio, and the method 300 makes a fourth pass through the loop.

During the fourth pass, the current target ratio is 25 and the previous target ratio is 10. The current set therefore includes applications A and D. The sum of the weights of the current set is 3. The product of the weights and the difference between the current and previous targets is 45. This amount is less than the unallocated memory, so the current target ratio is used to allocate memory to applications A and D. Multiplying the target ratio by the weights, application A's allocation becomes 50; application D's allocation becomes 25. The unallocated memory is now 40. The current target ratio advances, and the method 300 makes a fifth pass through the loop.

During the fifth pass, the current target ratio is 30 and the previous target ratio is 25. The current set now includes applications A, C, and D. The sum of the weights of the current set is 5 (2+2+1), and the product of the sum of the weights and the difference between the current and previous target ratios is 25. This value is less than the unallocated memory, so the current ratio is used to allocate memory to A, C, and D. After the fifth pass through the loop, applications A–D are allocated 60, 20, 60, and 30 units of memory, respectively. The unallocated memory totals 15. The target ratio advances and the method enters the sixth pass through the loop.

During the sixth pass, the current target ratio is 40, and the previous target ratio is 30. The current set is A and D.

Application C reached its maximum memory entitlement of 60 during the previous allocation round and is therefore dropped from the current set during the sixth pass. The sum of the weights is 3 and the product of this sum and the difference between the current and previous target ratios is 30, so this pass would require 30 units of unallocated memory. Because the unallocated memory is less than 30 ("yes" branch at block 340 in FIG. 3), the current target ratio cannot be used, and a final ratio is calculated (block 370 in FIG. 3) to allocate the remaining 15 units of unallocated memory.

FIG. 4d shows the calculation of the final ratio and its allocation. The final ratio is the previous target ratio, plus the unallocated memory divided by the sum of the weights of the current set (30+(15/3)=35). Using the final ratio, the unallocated resources are allocated to the current set according to the weights of the applications therein. The final allocations (also referred to as the entitlements or entitlement(g)) in this example are 70, 20, 60, and 35 for the respective groups.

FIGS. 5a–d show additional example calculations of memory allocations using the method described in FIGS. 2 and 3, similar to the examples of FIGS. 4a–d, but in which one of the applications, application A, is inactive. Because application A is inactive, some of the memory resources that would otherwise be allocated to application A are reallocated to the active applications. FIG. 5a shows a chart of the application parameters, including an indicator of the status of the applications as either active or inactive. Because the example of FIGS. 5a–d follows the example of FIGS. 4a–d, with the sole exception that application A is inactive, the minimum entitlement (min(g)), maximum entitlement (max (g)), and weight (weight(g)) values for the applications are the same as shown in FIG. 4a.

FIG. 5b shows the calculation of the allocation, request (g), and the allocation and request ratios for each application, again using the method described with respect to FIGS. 2 and 3. As with the example of FIG. 4b, each application has been allocated its minimum entitlement (block 280 in FIG. 2), so the initial allocations for applications A–D are 10, 5, 50, and 10 respectively. The unallocated memory is now 110 (185 minus 75). The request for each active application is set equal to the maximum entitlement (block 282 in FIG. 2). Because application A is inactive in this example, its requested amount is set to its minimum entitlement of 10, which it has already been allocated. For applications A–D, the requests are set equal to 10, 20, 60, and 100 respectively. Initially, the allocation ratios are calculated as the minimum entitlements divided by the weights of the applications, block 310. The request ratios are calculated as the requests divided by the weights of the applications, block 310.

FIG. 5c shows the calculations of the example as memory is allocated through the method shown in the lower portion of the flow chart of FIG. 3, as the method walks through the loop (blocks 330–360 in FIG. 3) attempting to allocate memory based on various target ratios. The first pass through the loop is substantially the same as that shown in FIG. 4c. During the first pass through the loop defined as blocks 330–360 in FIG. 3, the previous target ratio is set to 1, as the lowest of the allocation and request ratios, and the current target ratio is set to 4, as the second lowest of the allocation and request ratios. During the first pass, only application B is in the current set. The sum of the weights of the current set is 5. The product of the sum of the weights and the difference between the current and previous target ratios is 15 (5×(4−1)). Because the unallocated memory (110 units) exceeds this product (15 units) ("no" branch at block 340 in FIG. 3), the current target ratio can be used to allocate memory to the current set. Application B receives 20 units of memory (4×5) to replace the 10 units previously allocated to application B. The unallocated memory now has a value of 95 (110 units−15 units). The target ratio is advanced (block 360 in FIG. 3) to the value of the next highest weight ratio, and the method 300 loops back to block 330 to try to allocate based on this target ratio.

During the second pass, the previous target is 4 and the current target is 5. Because its request ratio was decreased due to application A being inactive, application A now fits into the current set during the second pass in this example. The sum of the weights of the current set is 2, and the product of the weights and the target ratio is 10. However, application A already has 10 units of memory so it receives no additional memory during this pass, and the unallocated resources remain at 95 after the second pass. During the third pass, the target ratio is increased to the next weight ratio of 10. No applications fit within the current set during the third pass, so the target ratio is then increased to 25 for a fourth pass.

During the fourth pass, the current target ratio is 25 and the previous target ratio is 10. The current set of applications therefore includes only application D. The sum of the weights of the current set is 1. The product of the sum of the weights of the current set and the difference between the current and previous targets is 15. This amount is less than the unallocated memory, so the current target ratio is used to allocate memory to application D. Multiplying the target ratio by the weights, application D's allocation becomes 25. The unallocated memory is now 80 (instead of 40 in the example of FIG. 4d). The current target ratio advances, and the method 300 makes a fifth pass through the loop.

During the fifth pass, the current target ratio is 30 and the previous target ratio is 25. The current set now includes applications C and D. The sum of the weights of the current set is 3 (2+1), and the product of the sum of the weights and the difference between the current and previous target ratios is 15. This value is less than the unallocated memory, so the current ratio is used to allocate memory to C and D. After the fifth pass through the loop, applications A–D are allocated 10, 20, 60, and 30 units of memory, respectively. The unallocated memory totals 65. The target ratio advances and the method 300 enters the sixth pass through the loop.

During the sixth pass, the current target is 100, and the previous target is 30. The current set is only D, because application C reached its maximum memory entitlement of 60 during the previous round. The sum of the weights is 1 and the product of this sum and the difference between the current and previous target ratios is 70, so this pass would require 70 units of unallocated memory. Because the unallocated memory is less than 70 ("yes" branch at block 340 in FIG. 3), the current target ratio cannot be used and a final ratio is calculated (block 370 in FIG. 3) to allocate the remaining 65 units of unallocated memory.

FIG. 5d shows the calculation of the final ratio and its allocation. The final ratio is the previous target ratio, plus the unallocated memory divided by the sum of the weights of the current set (30+(65/1)=95). Using the final ratio, the unallocated resources are allocated to the current set according to the weights of the applications therein. The final allocations (also referred to as the entitlements or entitlement(g)) in this example are 10, 20, 60, and 95 for the respective groups.

Although the present invention has been described with respect to particular embodiments thereof, variations are possible. For example, although the method of allocating resources has been described with respect to allocating memory, one skilled in the art will recognize that it may be applied to various types of system resources. The present invention may be embodied in specific forms without departing from the essential spirit or attributes thereof. It is desired that the embodiments described herein be considered in all respects illustrative and not restrictive and that reference be made to the appended claims and their equivalents for determining the scope of the invention.

The invention claimed is:

1. A computerized method for allocating computer system resources, comprising:
    calculating weight ratios for a plurality of applications to which system resources are allocated, wherein the applications have weights associated with the applications based on input parameters received, the weights are numerical values indicating a priority, the weight ratios include an allocation ratio, which is an amount of memory already allocated to an application divided by the associated weight, and a request ratio, which is a requested amount of resources divided by the associated weight of the application;
    setting a target ratio based on the weight ratios;
    determining a current set of applications for execution using the weight ratios;
    determining whether there are sufficient unallocated resources to allocate to each application in the current set using the target ratio; and
    if there are sufficient unallocated resources to allocate to each application in the current set using the target ratio, changing the target ratio to a new target ratio,
    subsequently determining whether there are sufficient unallocated resources to allocate to each application in the current set using the new target ratio, and
    allocating resources based on the subsequently determining whether there are sufficient unallocated resources.

2. The method of claim 1, further comprising, if there are not sufficient unallocated resources to allocate to each application in the current set using the target ratio, allocating resources based on the target ratio.

3. The method of claim 2, further comprising, if there are remaining resources after the allocating based on the target ratio, allocating the remaining resources to the applications in the current set using a final ratio.

4. The method of claim 1, wherein the step of changing the target ratio comprises changing the target ratio based on the weight ratios.

5. The method of claim 1, wherein the step of changing the target ratio comprises advancing the target ratio to a next highest weight ratio.

6. The method of claim 1, wherein the step of setting the target ratio comprises initializing a current target ratio to a second-lowest weight ratio and initializing a previous target ratio to a lowest weight ratio, and wherein the step of changing the target ratio comprises changing the current target ratio.

7. The method of claim 1, wherein the step of determining whether there are sufficient unallocated resources to allocate to each application in the current set comprises determining whether there are sufficient unallocated resources to allocate to each application in the current set an amount of resources based on the product of the target ratio and the weight for each application.

8. A tangible, computer-readable medium having stored thereon computer-executable instructions for performing a method of allocating computer system resources among multiple applications, the method comprising:
    calculating weight ratios for a plurality of applications to which system resources are allocated, wherein the applications have weights associated with the applications based on input parameters received, the weights are numerical values indicating a priority, the weight ratios include an allocation ratio, which is an amount of memory already allocated to an application divided by the associated weight, and a request ratio, which is a requested amount of resources divided by the associated weight of the application;
    setting a target ratio based on the weight ratios;
    determining a current set of applications for execution using the weight ratios;
    determining whether there are sufficient unallocated resources to allocate to each application in the current set using the target ratio; and
    if there are sufficient unallocated resources to allocate to each application in the current set using the target ratio, changing the target ratio to a new target ratio,
    subsequently determining whether there are sufficient unallocated resources to allocate to each application in the current set using the new target ratio, and
    allocating resources based on the subsequently determining whether there are sufficient unallocated resources.

9. The medium of claim 8, wherein the method further comprises:
    if there are not sufficient unallocated resources to allocate to each application in the current set using the target ratio, allocating resources based on the target ratio; and
    if there are remaining resources after the allocating based on the target ratio, allocating the remaining resources to the applications in the current set using a final ratio, and wherein the step of changing the target ratio comprises changing the target ratio based on the weight ratios.

* * * * *